March 4, 1958

J. L. MANNING 2,825,128

MOTOR SUPPORT

Filed March 20, 1956

INVENTOR.
JAMES L. MANNING
BY
McMorrow, Berman & Davidson
ATTORNEYS

March 4, 1958  J. L. MANNING  2,825,128
MOTOR SUPPORT
Filed March 20, 1956  2 Sheets-Sheet 2
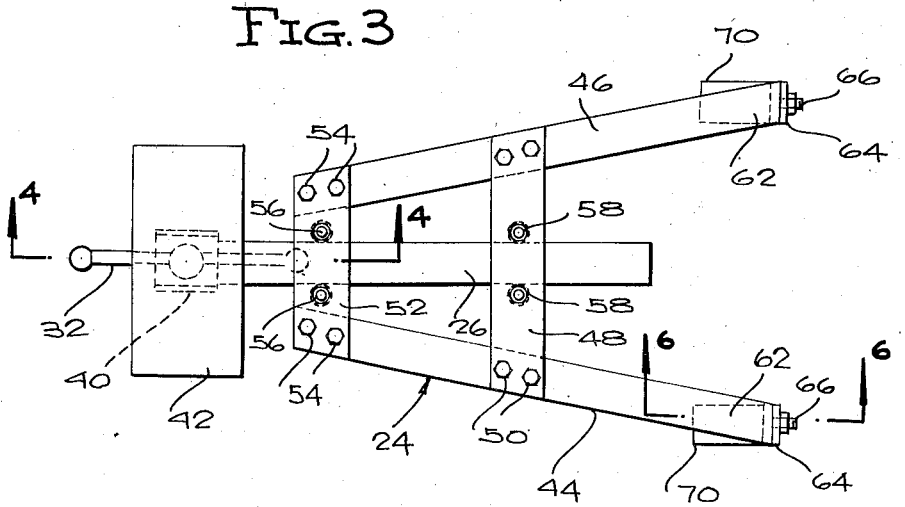
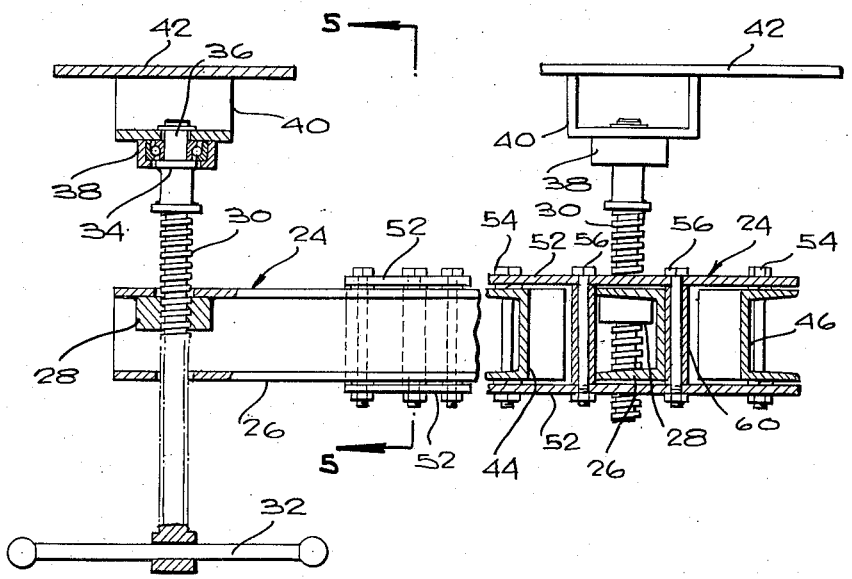
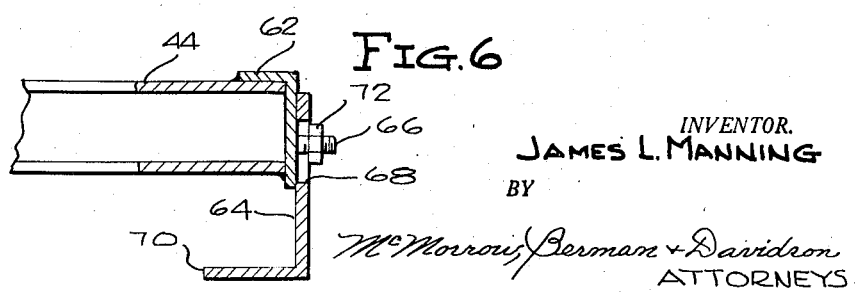
INVENTOR.
JAMES L. MANNING
BY
McMorrow, Berman & Davidson
ATTORNEYS United States Patent Office 2,825,128
Patented Mar. 4, 1958

2,825,128
MOTOR SUPPORT

James L. Manning, Waco, Tex.

Application March 20, 1956, Serial No. 572,683

3 Claims. (Cl. 29—289)

Considerable difficulty exists in removing automatic transmissions of automobiles, without disturbing the fly wheel and the engine. Heretofore, this work has been done on the floor of the garage, using bricks, blocks of wood, jacks, and other devices to support the engine while the transmission is being removed. In this connection, hydraulic lifts are used in almost all major garages, that permit the mechanic to stand or sit while working on the underside of a vehicle. However, the particular task described still cannot be accomplished with the lift in an elevated position.

The object of the present invention is to provide a motor support attachable to a conventional hydraulic lift, which will permit a transmission change to be done on a vehicle with the lift in an elevated position. To this end, the invention, summarized briefly, includes a pair of divergent arms having at their divergent ends clamp means for engaging the cross beam of a conventional twin post hydraulic lift, at opposite sides of the ram of the lift. Connected between the arms, at their convergent ends and also at a location intermediate the ends of the arms, are combined connecting and guide members, said members being adapted to provide a guide or slideway extending longitudinally and centrally of the device. An elongated member slides in the guideway, and has one end projecting beyond the convergent ends of the arms. Mounted in said one end of the member for vertical adjustment is a support plate adapted to engage against the underside of the engine, to support the engine while the mentioned removal of the automatic transmission is effected.

Among important objects of the invention are to provide a motor support which will permit the removal of an automatic transmission without disturbing the fly wheel and engine, with the vehicle in an elevated position upon a conventional hydraulic lift; to provide a support as stated which will fit on any twin post automobile lift; to provide a support that will be adapted to fit any automobile; to facilitate the attachment of the device to a conventional lift, and to facilitate, further, the detachment of the device whenever it is not needed; and to provide a motor support that will be capable of manufacture at relatively low cost, will be rugged, and fully efficient in the discharge of its intended functions.

Other objects will appear from the following description, the claims appended thereto, and from the annexed drawing, in which like reference characters designate like parts throughout the several views, and wherein:

Figure 3 is a top plan view of the motor support per se;

Figure 4 is an enlarged, longitudinal sectional view, portions being broken away, on line 4—4 of Figure 3;

Figure 5 is a sectional view on the same scale as Figure 4, taken transversely of the device on line 5—5 of Figure 4; and Figure 6 is an enlarged, detail sectional view on line 6—6 of Figure 3.

Figure 1:
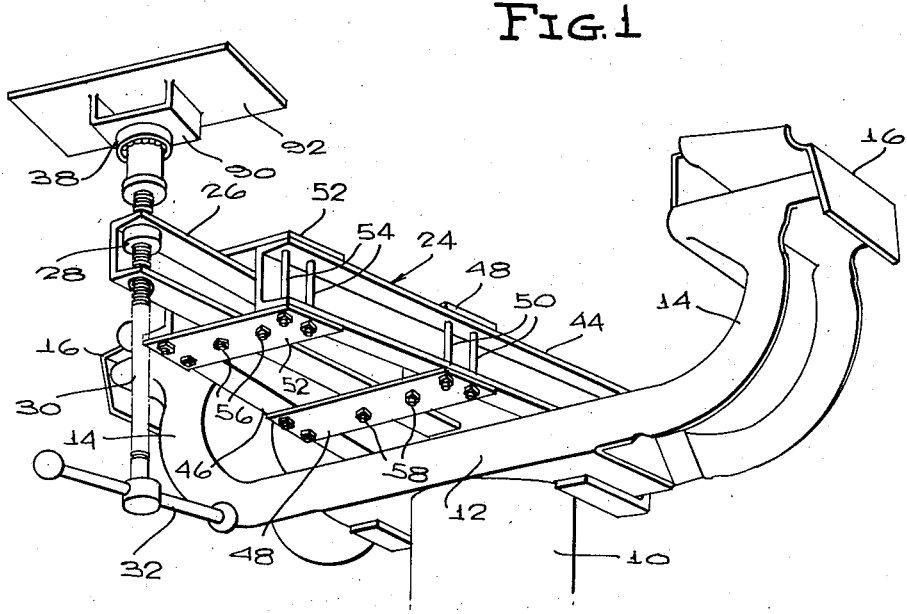
Figure 1 is a perspective view of a motor support formed according to the present invention, attached to a conventional twin post hydraulic lift.
Figure 2:
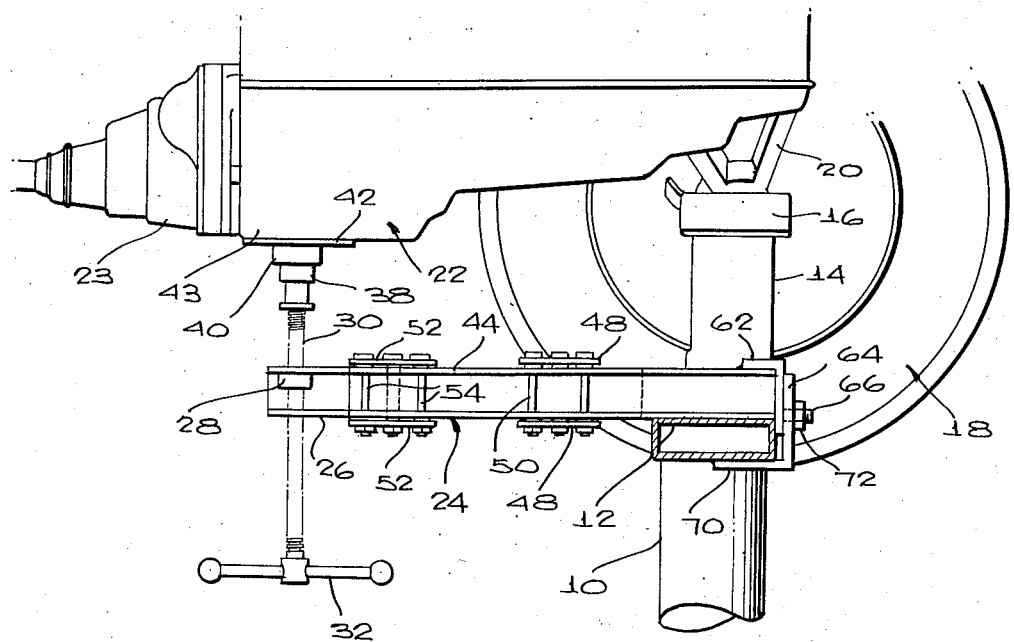
Figure 2 is a side elevational view of the support, the lift being shown in section, a supported vehicle being illustrated fragmentarily.

The device constituting the present invention is illustrated mounted on a conventional twin post hydraulic lift including a ram 10, a cross beam 12, upwardly projecting support arms 14, and support plates 16. In Figure 2 there is shown fragmentarily a vehicle supported upon the lift, the vehicle being designated generally at 18 and including front wheels support means 20 and an engine 22 the transmission 23 of which is to be removed.

The device constituting the invention has been generally designated at 24, and includes an elongated center arm 26 extending longitudinally and centrally of the device and formed of channel material as shown in Figure 5, in a preferred embodiment. The center arm 26 is straight from end to end, and at its head or front end, shown at the left in Figures 3 and 4, is provided with a block 28 fixedly secured to the underside of the top wall of the arm. Block 28 has a threaded opening in registration with the larger, smooth-walled opening of said top wall of arm 26, and threadedly engaged in the opening of the block 28 is a vertically disposed, threaded post 30 having at its lower end a cross bar 32 slidable within post 30 perpendicularly to the length of the post, to provide a handle facilitating turning of the post.

At its upper end, the post 30 is provided with a collar 34 above which is a reduced axial extension 36, and surrounding the extension 36 is a conventional bearing 38, secured to the underside of a U-shaped member 40 rigid with and depending from the underside of a rectangular, horizontally disposed motor support plate 42.

By adjustments effected through rotation of the post 30, the support plate 42 can be elevated or lowered as necessary, and when the post is shifted upwardly, the support plate ultimately is brought to bear against the underside of the oil pan 43 of the engine 22, thus to support the engine at its back, with the vehicle supported in elevated position upon the hydraulic lift, in a manner that will permit removal of the automatic transmission without disturbing the fly wheel or other components of the engine.

At 44, 46 there have been designated side arms, diverging in a direction away from the motor support plate 42. The side arms are of oppositely, outwardly facing channel material as shown in Figure 5, and fixedly connected between the side arms, intermediate their ends, is a first pair of flat, generally rectangular connecting plates 48, these being secured to the side arms at their ends by bolts 50 or the like. The connecting plates 48 extend perpendicularly to the length of the arm 26, and are in face-to-face contact with the top and bottom surfaces of the arms 44, 46, thus defining a space between the midlength portions of the connecting plates within which the inner end portion of the center arm 26 may slide.

Shorter connecting plates 52 are similarly connected, as by bolts 54, between the convergent ends of the side arms 44, 46 providing a space within which slides the intermediate portion of the center arm 26.

Connected between the plates 52, inwardly from the convergent ends of the arms 44, 46 are bolts 56 (Figure 5), while similar bolts 58 are connected between the plates 48. The bolts 56 extend through sleeves 60, bolts 58 being similarly extended through sleeves, the sleeves being in contact with the opposite sides of the center arm as shown in Figure 5.

The bolts 56, 58 and their associated sleeves define a guideway extending longitudinally and centrally of the device, within which the arm 26 may slide in the direction of its length. As a result, the arm 26 may be extended by shifting the same to the left in Figure 3, the purpose of this arrangement being to locate the motor support plate 42 at a particular point in respect to the length of the vehicle engine. This is necessary inasmuch as some oil pans on automobiles are longer than others, thereby making it desirable that adjustment be provided that will permit the support plate 42 to be properly located upon the engine.

Secured to the divergent ends of the arms 44, 46 (see Figures 2, 3, and 6), are angular brackets 62, and vertically adjustable upon said brackets are L-shaped clamp arms 64, having vertical slots receiving studs 66 projecting outwardly from the brackets 62 and fixedly secured to the brackets, the brackets being in turn welded or otherwise fixedly attached to their associated arms. The slots 68 of the clamp arms 64 permit limited vertical adjustment of the clamp arms, so that the device may be mounted upon the cross beam 12 of the hydraulic lift, by engagement of the horizontal legs 70 of the clamp arms against the underside of the cross beam, with the top surface of the cross beam being engaged against the undersides of the arms 44, 46. After the necessary adjustment has been made, a nut 72 is tightened, thus securely clamping the device to the cross beam in position extending horizontally from one side of the cross beam, longitudinally of the supported vehicle, thus to locate the plate 42 under the oil pan of the vehicle.

With the device mounted upon the lift in the manner stated, the plate 42 is adjusted upwardly to bear against the oil pan, after which the transmission 23 can be removed without difficulty.

The device as constructed will fit conventional hydraulic lifts, without requiring modification or redesign either of the device or of said lifts.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A motor support for use in supporting the motor of a vehicle during removal of the transmission of said vehicle comprising a generally A-shaped frame lying in a horizontal plane with the wider end thereof for face-to-face contact with and overlying a cross beam of a hydraulic lift, said frame having a guideway therethrough extending longitudinally and centrally of the frame and opening upon the smaller end of the frame; brackets carried by the wider end of the frame and spaced transversely of said wider end, for detachably clamping the frame at the wider end thereof to said cross beam, said brackets including L-shaped members depending from the wider end of the frame to engage under the cross beam, thus to clamp the cross beam between the frame and said L-shaped elements in position to fixedly mount the frame upon the cross beam with the smaller end of the frame disposed outwardly from the cross beam in the direction of the length of the supported vehicle; a center arm slidably adjustable within said guideway and projecting beyond a smaller end of the frame; and means mounted in the projecting end of the center arm and adjustable in a vertical direction into engagement with the pan of the motor to provide for a support below said pan.

2. A motor support for use in supporting the motor of a vehicle during removal of the transmission of said vehicle comprising a generally A-shaped frame lying in a horizontal plane with the wider end thereof for face-to-face contact with and overlying a cross beam of a hydraulic lift, said frame having a guideway therethrough extending longitudinally and centrally of the frame and opening upon the smaller end of the frame; brackets carried by the wider end of the frame and spaced transversely of said wider end, for detachably clamping the frame at the wider end thereof to said cross beam, said brackets including L-shaped members depending from the wider end of the frame to engage under the cross beam, thus to clamp the cross beam between the frame and said L-shaped elements in position to fixedly mount the frame upon the cross beam with the smaller end of the frame disposed outwardly from the cross beam in the direction of the length of the supported vehicle; a center arm slidably adjustable within said guideway and projecting beyond a smaller end of the frame; and means mounted in the projecting end of the center arm and adjustable in a vertical direction into engagement with the pan of the motor to provide for a support below said pan, said frame including a pair of divergent side frame members to which said L-shaped elements are connected, the frame further including at the smaller end thereof vertically spaced, transversely extending plates connected to and spaced apart by the side frame members, said plates defining the forward end of the guideway between the same, the frame additionally including intermediate its opposite ends plates also connected to and extending transversely between said side frame members with the side frame members spacing the last named plates apart, whereby said last named plates define the inner portion of said guideway.

3. A motor support for use in supporting the motor of a vehicle during removal of the transmission of said vehicle comprising a generally A-shaped frame lying in a horizontal plane with the wider end thereof for face-to-face contact with and overlying a cross beam of a hydraulic lift, said frame having a guideway therethrough extending longitudinally and centrally of the frame and opening upon the smaller end of the frame; brackets carried by the wider end of the frame and spaced transversely of said wider end, for detachably clamping the frame at the wider end thereof to said cross beam, said brackets including L-shaped members depending from the wider end of the frame to engage under the cross beam, thus to clamp the cross beam between the frame and said L-shaped elements in position to fixedly mount the frame upon the cross beam with the smaller end of the frame disposed outwardly from the cross beam in the direction of the length of the supported vehicle; a center arm slidably adjustable within said guideway and projecting beyond a smaller end of the frame; and means mounted in the projecting end of the center arm and adjustable in a vertical direction into engagement with the pan of the motor to provide for a support below said pan, said frame including a pair of divergent side frame members to which said L-shaped elements are connected, the frame further including at the smaller end thereof vertically spaced, transversely extending plates connected to and spaced apart by the side frame members, said plates defining the forward end of the guideway between the same, the frame additionally including intermediate its opposite ends plates also connected to and extending transversely between said side frame members with the side frame members spacing the last named plates apart, whereby said last named plates define the inner portion of said guideway, said frame further including pins connected between the last named plates intermediate the side frame members, said pins being spaced longitudinally of the last named plates to cooperate with the last named plates in defining the guideway, said center arm having an inner end portion extending between and guided by said pins.

References Cited in the file of this patent

UNITED STATES PATENTS

| | | |
|---|---|---|
| 842,007 | Parker | Jan. 22, 1907 |
| 1,463,882 | Fuller | Aug. 7, 1923 |
| 1,600,835 | Manley | Sept. 21, 1926 |
| 2,427,695 | Smith | Sept. 23, 1947 |
| 2,479,623 | Johnson | Aug. 23, 1949 |
| 2,523,734 | Stephenson et al. | Sept. 26, 1950 |